US010004086B2

(12) United States Patent
Guo

(10) Patent No.: US 10,004,086 B2
(45) Date of Patent: Jun. 19, 2018

(54) METHOD AND APPARATUS FOR REPORTING BUFFER STATUS FOR DEVICE TO DEVICE COMMUNICATION IN A WIRELESS COMMUNICATION SYSTEM

(71) Applicant: INNOVATIVE SONIC CORPORATION, Taipei (TW)

(72) Inventor: Yu-Hsuan Guo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 116 days.

(21) Appl. No.: 14/664,268

(22) Filed: Mar. 20, 2015

(65) Prior Publication Data

US 2015/0296407 A1 Oct. 15, 2015

Related U.S. Application Data

(60) Provisional application No. 61/977,823, filed on Apr. 10, 2014.

(51) Int. Cl.
*H04L 12/26* (2006.01)
*H04W 72/12* (2009.01)

(52) U.S. Cl.
CPC ....... *H04W 72/1284* (2013.01); *H04W 76/23* (2018.02); *H04W 76/14* (2018.02)

(58) Field of Classification Search
CPC .... H04W 72/04; H04W 76/023; H04W 72/02
See application file for complete search history.

(56) References Cited

U.S. PATENT DOCUMENTS

| 2013/0064103 A1* | 3/2013 | Koskela ............ H04W 72/1284 370/252 |
| 2013/0322413 A1* | 12/2013 | Pelletier ............ H04W 72/1289 370/336 |
| 2014/0321423 A1* | 10/2014 | Kalhan ............ H04W 72/0493 370/330 |
| 2015/0264677 A1* | 9/2015 | He ........................ H04W 72/02 370/312 |

(Continued)

FOREIGN PATENT DOCUMENTS

| EP | 2182770 A2 | 5/2010 |
| GB | 2494633 A | 3/2013 |

(Continued)

OTHER PUBLICATIONS

3GPP TSG-RAN WG2 Meeting#85bis, Valencia, Spain, Mar. 31-Apr. 4, 2014 (R2-141195).

(Continued)

*Primary Examiner* — Chi H Pham
*Assistant Examiner* — Fahmida Chowdhury
(74) *Attorney, Agent, or Firm* — Blue Capital Law Firm, P.C.

(57) ABSTRACT

Methods and apparatuses for improving device to device (D2D) communication are disclosed herein. One method includes a user equipment (UE) triggering a buffer status report (BSR) upon configuration or setup of radio resource allocation mode 1 for D2D communication while the UE has data available for transmission for D2D communication. The method further includes the UE transmitting a Medium Access Control (MAC) Control Element corresponding to the BSR.

18 Claims, 8 Drawing Sheets

(56) References Cited

U.S. PATENT DOCUMENTS

| | | | |
|---|---|---|---|
| 2015/0282234 A1* | 10/2015 | Sartori | H04W 72/042 370/329 |
| 2015/0334756 A1* | 11/2015 | Lu | H04W 76/023 370/329 |
| 2016/0183276 A1* | 6/2016 | Marinier | H04W 72/02 370/329 |

FOREIGN PATENT DOCUMENTS

| | | |
|---|---|---|
| WO | 2013183728 A1 | 12/2013 |
| WO | 2014014323 A1 | 1/2014 |

OTHER PUBLICATIONS

3GPP TSG-RAN WG2 Meeting#85bis, Valencia, Spain, Mar. 31-Apr. 4, 2014 (R2-141222).

3GPP TSG-RAN WG2 #85bis, Valencia, Spain, Mar. 31-Apr. 4, 2014 (R2-141256).

3GPP TSG-RAN WG2 #85bis, Valencia, Spain, Mar. 31-Apr. 4, 2014 (R2-141473).

3GPP TSG-RAN WG2 #85bis, Valencia, Spain, Mar. 31-Apr. 4, 2014 (R2-141527).

3GPP TSG-RAN WG2 Meeting #85bis, Valencia, Spain, Mar. 31-Apr. 4, 2014 (R2-141639).

3GPP TSG-RAN WG2 Meeting #85bis, Valencia, Spain, Mar. 31-Apr. 4, 2014 (R2-141837).

3GPP TSG-RAN WG2 #85bis, Valencia, Spain, Mar. 31-Apr. 4, 2014 (R2-141838).

Office Action on corresponding JP Patent Application No. 2015-079644 dated Mar. 8, 2016.

Office Action on corresponding KR Patent Application No. 10-2015-0049443 dated Jun. 21, 2016.

3GPP TS 36.321 V12.1.0 (Mar. 2014).

3GPP TS 36.843 V12.0.1 (Mar. 2014).

Search Report on corresponding EP Patent Application No. 15163105.8 dated Jun. 22, 2015.

\* cited by examiner

METHOD AND APPARATUS FOR REPORTING BUFFER STATUS FOR DEVICE TO DEVICE COMMUNICATION IN A WIRELESS COMMUNICATION SYSTEM

CROSS-REFERENCE TO RELATED APPLICATIONS

The present application claims the benefit of U.S. Provisional Patent Application Ser. No. 61/977,823 filed on Apr. 10, 2014 the entire disclosure of which is incorporated herein by reference.

FIELD

This disclosure generally relates to wireless communication networks, and more particularly, to methods and apparatuses for improving device to device communication.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses are for improving device to device (D2D) communication are disclosed herein. A user equipment (UE) can provide buffer status for data to be transmitted via D2D communication to an evolved Node B (eNB) as soon as possible and performance of the D2D communication can be efficiently improved. One method includes a UE triggering a buffer status report (BSR) upon configuration or setup of radio resource allocation mode 1 for D2D communication and the UE has data available for transmission for D2D communication. The method further includes the UE transmitting a Medium Access Control (MAC) Control Element corresponding to the BSR.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. 3GPP TS 23.303 V12.0.0, "Proximity-based services (ProSe); Stage 2"; 3GPP TR 36.843 V12.0.1, "Study on LTE Device to Device Proximity Services; Radio Aspects"; RP-140518, "Work item proposal on LTE Device to Device Proximity Services"; R2-141838, "Introduction of ProSe in 36.300"; R2-141837, "LS to RAN2 on D2D resource allocation Modes 1&2"; 3GPP TS 36.321 V12.1.0, "E-UTRA MAC protocol specification"; R2-141527, "Scheduling Request for D2D Communication"; R2-141256, "Layer 2 procedures for D2D Communication"; R2-141222, "BSR reporting for D2D communication"; R2-141195, "D2D Communication Resource Allocation Mode 1"; and 3GPP TS 36.331 V12.1.0, "E-UTRA RRC protocol specification". The standards and documents listed above are hereby expressly incorporated by reference in their entirety.

Figure 1:
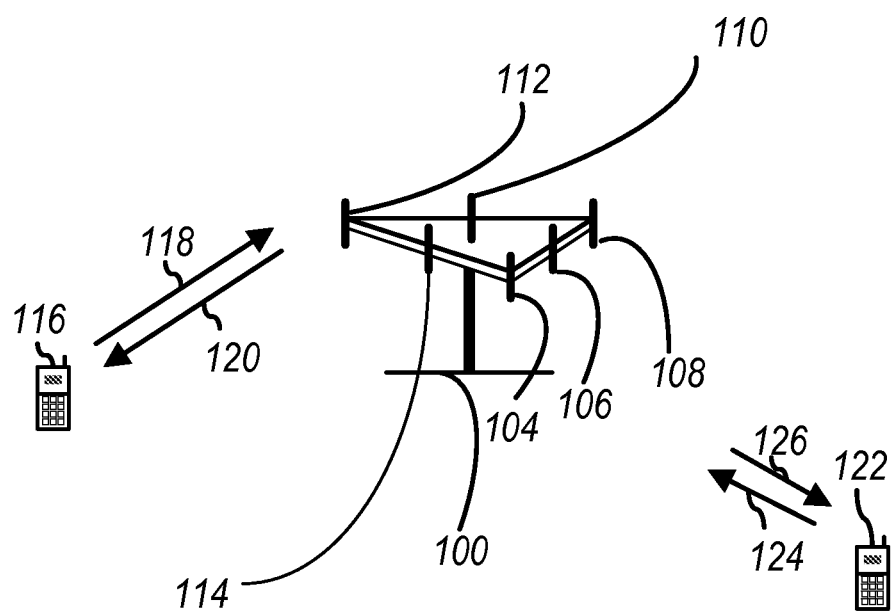
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNB, or some other terminology. An access terminal (AT) may also be called user equipment (UE), a wireless communication device, terminal, access terminal or some other terminology.

Figure 2:
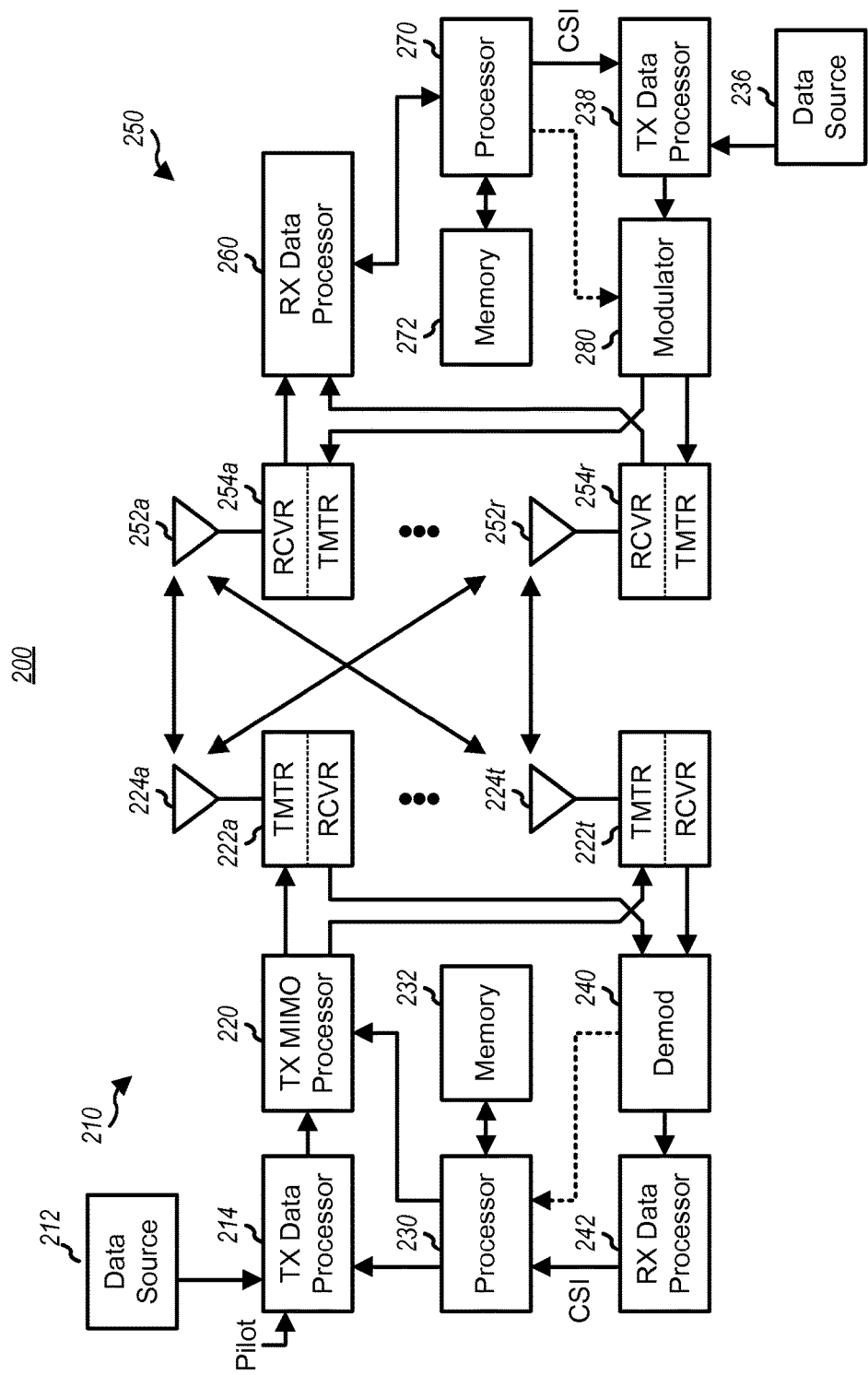
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
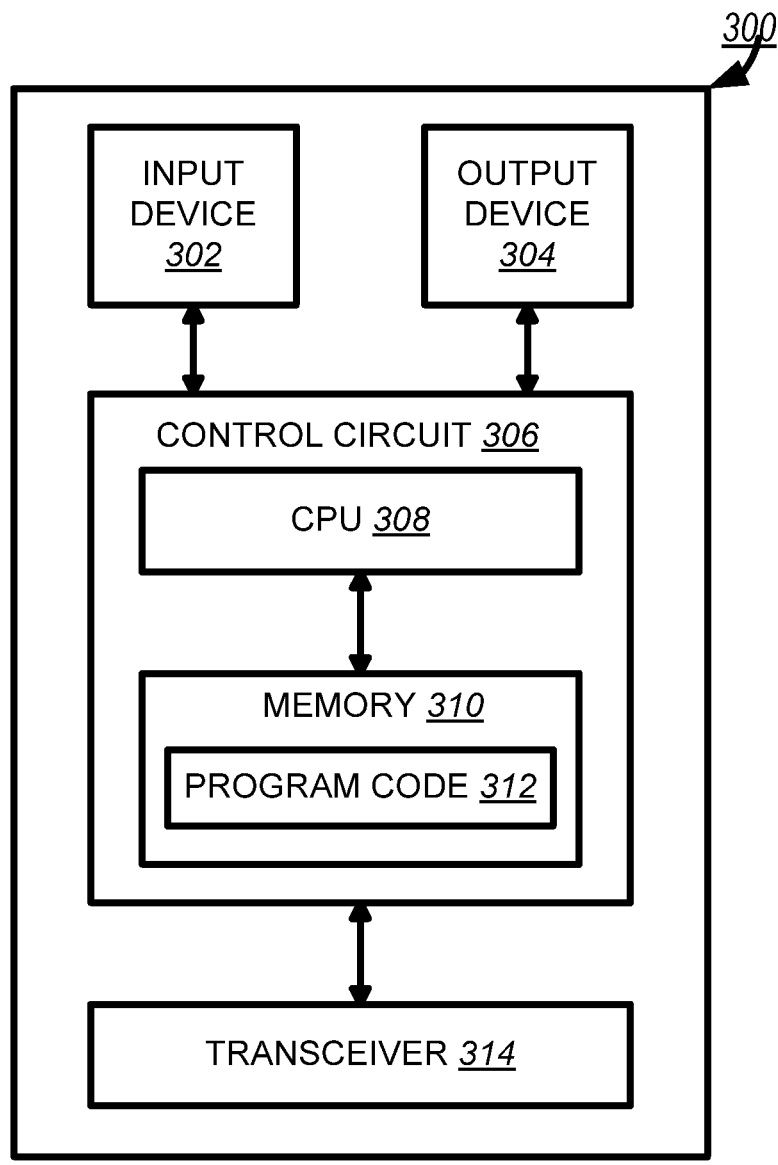
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
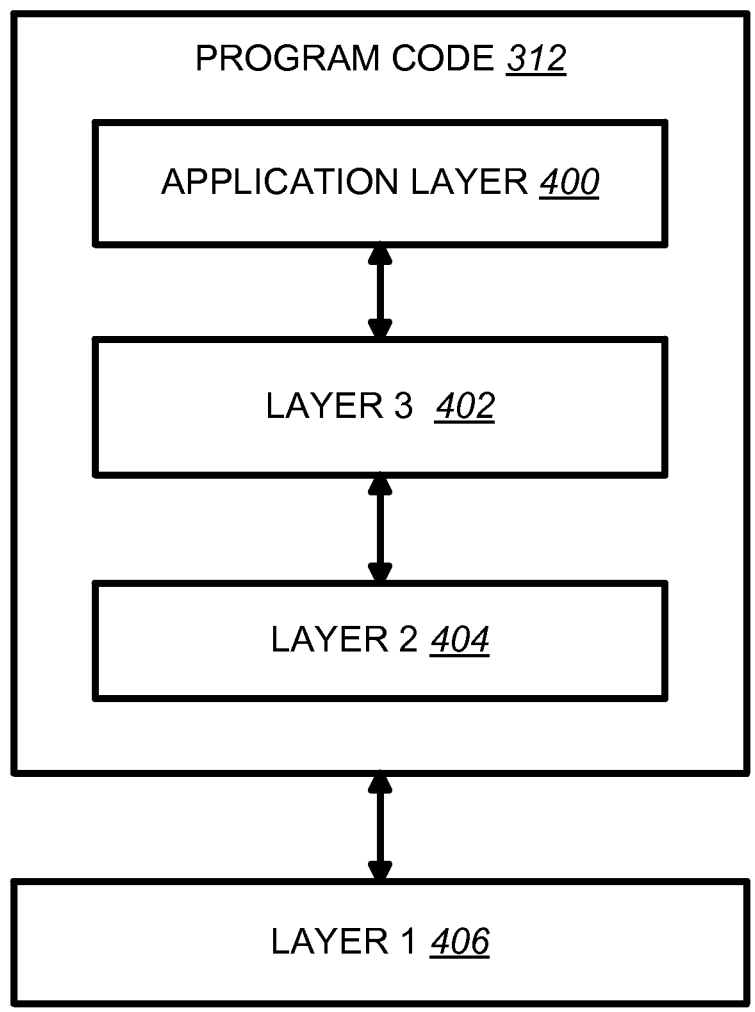
FIG. 4 is a functional block diagram of the program code of FIG. 3 according to one exemplary embodiment.
Figure 5A:
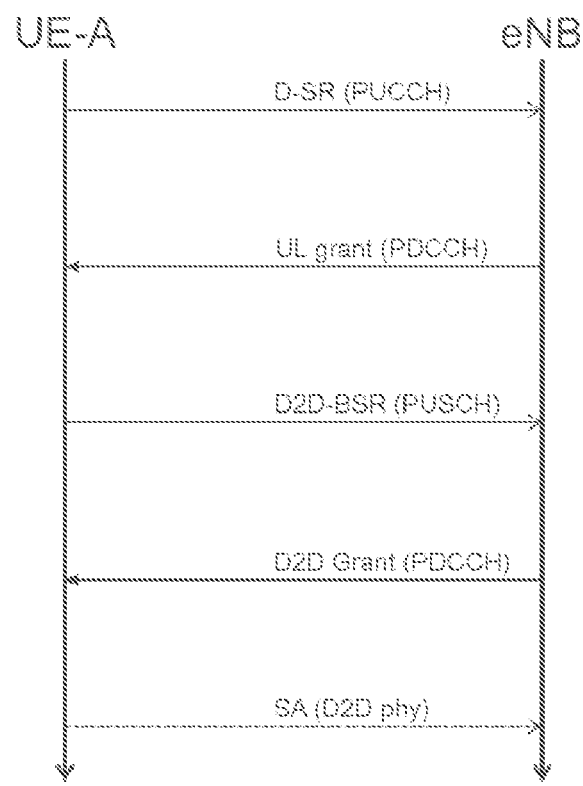
FIG. 5A is a diagram illustrating a Scheduling Request (SR) based request/grant procedure.
Figure 5B:
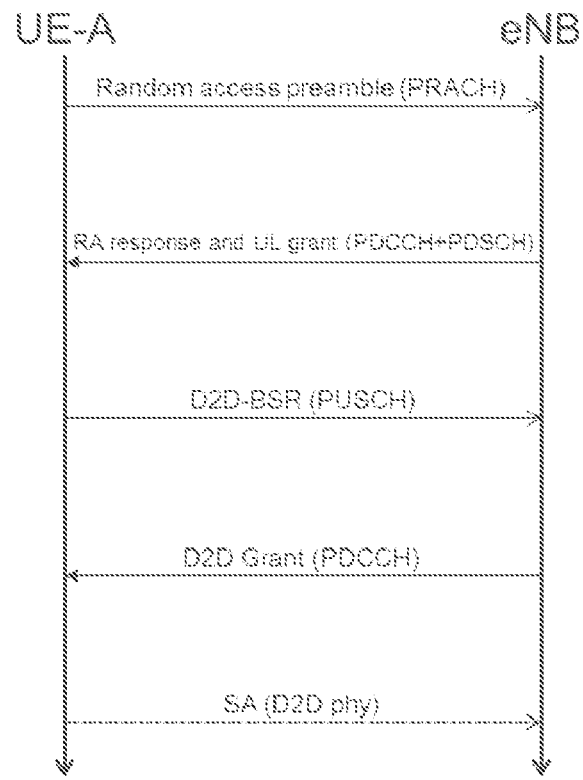
FIG. 5B is a diagram illustrating a Random Access Channel (RACH) based request/grant procedure

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

Device to Device (D2D) Proximity Services (ProSe) have two aspects: D2D discovery and D2D communication. The study by 3GPP Service and System Aspects (SA) working group(s) on D2D ProSe is completed and has been captured in 3GPP TS 23.303 V12.0.0. The study by RAN working groups on D2D ProSe is also completed and has been captured in 3GPP TR 36.843 V12.0.1. And the work item on LTE Device to Device Proximity Services has been approved in 3GPP RP-140518.

The D2D communication may also be called as D2D direct communication or ProSe Direct Communication. D2D communication is defined in 3GPP TS 23.303 V12.0.0 as a communication between two or more UEs in proximity that are ProSe-enabled, by means of user plane transmission using E-UTRA technology via a path not traversing any network node.

In 3GPP TR 36.843 V12.0.1, there are two resource allocation modes defined for D2D communication:

9.1.2 Resource Allocation

From a transmitting UE's perspective, a UE can operate in two modes for resource allocation:
  Mode 1: eNodeB or Release-10 relay node schedules the exact resources used by a UE to transmit direct data and direct control information
    FFS: if semi-static resource pool restricting the available resources for data and/or control is needed
  Mode 2: a UE on its own selects resources from resource pools to transmit direct data and direct control information
    FFS if the resource pools for data and control are the same
    FFS: if semi-static and/or pre-configured resource pool restricting the available resources for data and/or control is needed
  D2D communication capable UE shall support at least Mode 1 for in-coverage
  D2D communication capable UE shall support Mode 2 for at least edge-of-coverage and/or out-of-coverage And the radio resource management for D2D communication has the following agreements in 3GPP TR 36.843 V12.0.1:

9.2.3.2 Radio Resource Allocation

UEs in-coverage and out-of-coverage need to be aware of a resource pool (time/frequency) for D2D communication reception.
All UEs (Mode 1 ("scheduled") and Mode 2 ("autonomous")) are provided with a resource pool (time and frequency) in which they attempt to receive scheduling assignments.
Editor's Note: It is FFS how the resource pool is configured/provided to UEs in or out of coverage. (e.g. pre-configured; provided by eNodeB in SIB; forwarded by UEs in coverage to UEs out of coverage)
In Mode 1, a UE requests transmission resources from an eNodeB. The eNodeB schedules transmission resources for transmission of scheduling assignment(s) and data.
  The UE sends a scheduling request (D-SR or RA) to the eNodeB followed by a BSR based on which the eNodeB can determine that the UE intends to perform a D2D transmission as well as the required amount resources.
Editor's Note: It is FFS how the eNodeB indicates the transmission resources to the UE.
  In Mode 1, the UE needs to be RRC Connected in order to transmit D2D communication.
For Mode 2, UEs are provided with a resource pool (time and frequency) from which they choose resources for transmitting D2D communication.
Editor's Note: It is FFS for Mode 2, UEs in the "edge of coverage", obtain the transmission resource pool by the eNB (e.g. SIB signalling).
Editor's Note: It is FFS for For Mode 2, UEs out of coverage how they obtain the transmission resource pool (e.g. pre-configured; from other UEs; . . . ).
The eNodeB controls whether UE may apply Mode 1 or Mode 2 transmission. Details FFS.

And the further details for D2D communication have been captured in R2-141838 and shown in FIG. 1:

23.X.3 Radio resource allocation

From a transmitting UE's perspective, a UE can operate in two types for resource allocation:
  Mode 1 (eNB scheduled resource allocation):
    UE needs to be RRC Connected in order to transmit D2D communication.
    UE requests transmission resources from an eNodeB. The eNodeB schedules transmission resources for transmission of scheduling assignment(s) and D2D data.
    The UE sends a scheduling request (D-SR or RA) to the eNodeB followed by a BSR based on which the eNodeB can determine that the UE intends to perform a D2D transmission as well as the required amount resources.
  Mode 2 (UE autonomous resource selection):
    A UE on its own selects resources from resource pools to transmit scheduling assignment and D2D data.
A UE is considered in-coverage if it has a serving cell (CONNECTED) or is camping on a cell (IDLE). Following rules are applied for the mode used by a UE:
  If a UE is out of coverage it can only use mode 2.
  If a UE is in coverage it may use mode 2 if the eNB configures it accordingly.
  If a UE is in coverage it may use mode 1 if the eNB configures it accordingly.
  If the UE is instructed to use mode 1, there may be exceptional cases where the UE is allowed to use mode 2 temporarily.
Editor's Note: Criterion for exception case are FFS (e.g. if UE fails to establish an RRC connection). We intend to define the exceptional cases rather than an edge-of-coverage "state".
Editor's Note: How Mode is configured and changed.

And 3GPP Radio Access Network working group 1 (RAN1) also discusses how to decide the resource allocation mode for D2D communication in R2-141837:

RAN1 is therefore discussing the possibility of adding the following "shall" conditions for use of Mode 1 and Mode 2, although there is not currently consensus in RAN1 on introducing such conditions:
  A transmitting UE shall use Mode 2 if Z<X dBm or if no CRS is detected
  A transmitting UE shall use Mode 1 if Z>=Y dBm where Y>=X
where Z would be a defined DL power measurement based on CRS from the serving cell or the cell the UE is camping on, and X and Y could be pre-configured in the UEs and could be signaled by the eNB.

According to the background, a UE needs to provide buffer status for data to be transmitted via D2D communication to eNB in order to acquire radio resource for mode 1. There are two alternatives to provide the buffer status:
  Use current BSR MAC Control Element as disclosed in 3GPP TS 36.321 V12.1.0. For example, a Logical Channel Group (LCG) is allocated for D2D communication and is used to identify the group of D2D logical channels whose buffer status needs to be reported as disclosed in R2-141527.

Introduce a new MAC Control Element, e.g. called D2D BSR MAC Control Element, used to indicate the buffer status of D2D services as disclosed in R2-141256 and R2-141222.

Currently, as disclosed in 3GPP TS 36.321 V12.1.0, a BSR would be triggered if any of the following events occurs:

(a) UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

(b) UL resources are allocated and number of padding bits is equal to or larger than the size of the Buffer Status Report MAC control element plus its subheader, in which case the BSR is referred below to as "Padding BSR";

(c) retxBSR-Timer expires and the UE has data available for transmission for any of the logical channels which belong to a LCG, in which case the BSR is referred below to as "Regular BSR"; or (d) periodicBSR-Timer expires, in which case the BSR is referred below to as "Periodic BSR".

It is proposed in R2-141222 that events (a), (c), and (d) are applicable to trigger a BSR for D2D communication, e.g. D2D BSR MAC Control Element. And R2-141195 proposes to reuse all above events.

However, according to the background, when a UE tends to use radio resource allocation mode 1 for D2D communication, e.g. due to entering RRC_CONNECTED, configuration by network, or measurement becoming better, the UE may already use radio resource allocation mode 2. In other words, UE buffer already has data available for transmission for D2D communication. In this case, event (a) would not occur unless a new D2D service with a higher priority logical channel is initiated. And events (b), (c) and (d) may not occur immediately. Switching from mode 2 to mode 1 is delayed and D2D communication can't be improved efficiently because mode 1 uses dedicated radio resource and provides better performance.

Various embodiments of a method or an apparatus for improving D2D communication disclosed herein are directed to a new event for a UE to trigger a BSR to report buffer status for data to be transmitted via D2D communication. Further, the UE may transmit a Medium Access Control (MAC) Control Element corresponding to the BSR. The buffer status for data to be transmitted via D2D communication may be indicated by the MAC Control Element. The new event includes at least one of the following conditions:

upon configuration of buffer status reporting functionality to report buffer status for data to be transmitted via D2D communication.

upon setup of buffer status reporting functionality to report buffer status for data to be transmitted via D2D communication.

upon reconfiguration of buffer status reporting functionality to report buffer status for data to be transmitted via D2D communication.

upon entering RRC_CONNECTED (as disclosed in 3GPP TS 36.331 V12.1.0).

upon configuration of radio resource allocation mode 1 for D2D communication.

upon setup of radio resource allocation mode 1 for D2D communication.

upon reconfiguration of radio resource allocation mode 1 for D2D communication.

upon switching from radio resource allocation mode 2 for D2D communication to radio resource allocation mode 1 for D2D communication, e.g. due to measurement result better than a threshold.

In one embodiment, the BSR may be not triggered upon configuration, setup, or reconfiguration of buffer status reporting functionality which is used to report buffer status not for data to be transmitted via D2D communication, e.g. report buffer status for data to be transmitted via uplink to eNB.

In various embodiments, the UE already has data available for transmission for D2D communication. The UE does not have data, belonging to a logical channel with higher priority than data is already available for transmission for D2D transmission, becoming available for transmission for D2D communication, especially upon triggering the BSR. The UE does not change a serving cell, e.g. from one to another. The BSR may be a Regular BSR, for example, a BSR that can trigger a Scheduling Request as disclosed in 3GPP TS 36.321 V12.1.0. The UE is in RRC_CONNECTED. The UE is allowed to use radio resource allocation mode 1, e.g. sends a scheduling request (D-SR or RA) and a BSR to eNB to request transmission resource for D2D communication.

In one embodiment, the configuration or the reconfiguration is not used to disable the functionality. The configuration or the reconfiguration is not used to disable the radio resource allocation mode 1. The configuration, the setup, or the reconfiguration is provided via a RRC message, e.g. a RRCConnectionReconfiguration message as disclosed in 3GPP TS 36.331 V12.1.0. The configuration, the setup, or the reconfiguration is provided via system information. The configuration, the setup, or the reconfiguration is received from eNB.

In one embodiment, buffer status for data to be transmitted via D2D communication is indicated by a new MAC Control Element, such as the D2D BSR MAC Control Element.

Figure 6:
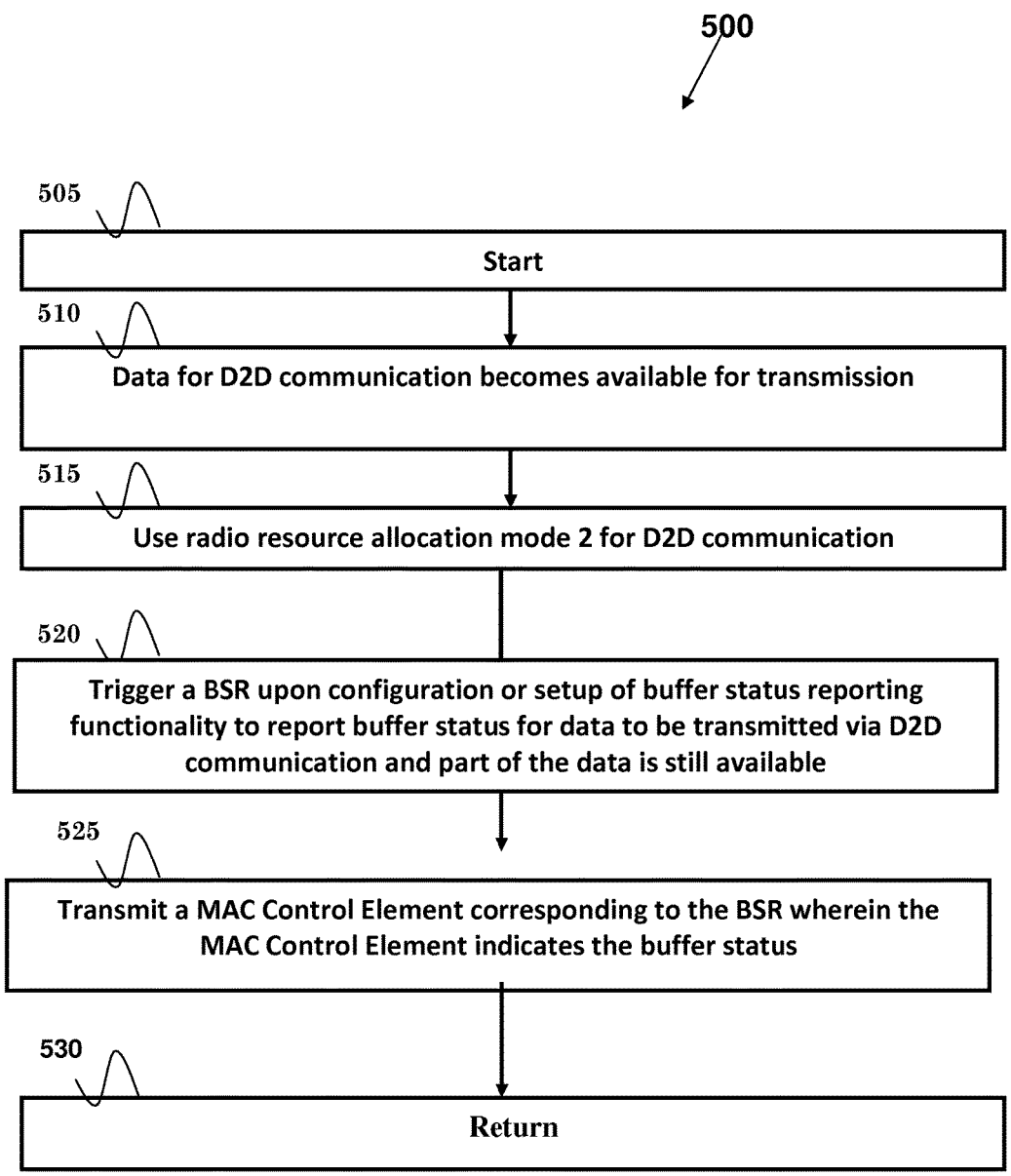
FIG. 6 is a flow diagram illustrating one exemplary embodiment.

FIG. 6 illustrates one exemplary method 500. In step 505, the process starts. In step 510, data for D2D communication becomes available for transmission. At step 515, the UE uses radio resource allocation mode 2 for D2D communication. At step 520, the UE triggers a BSR upon configuration or setup of the buffer status reporting functionality to report buffer status for data to be transmitted via D2D communication and part of the data is still available. At step 525, the UE transmits a MAC control element corresponding to the BSR, wherein the MAC control element indicates the buffer status. At step 530, return.

Figure 7:
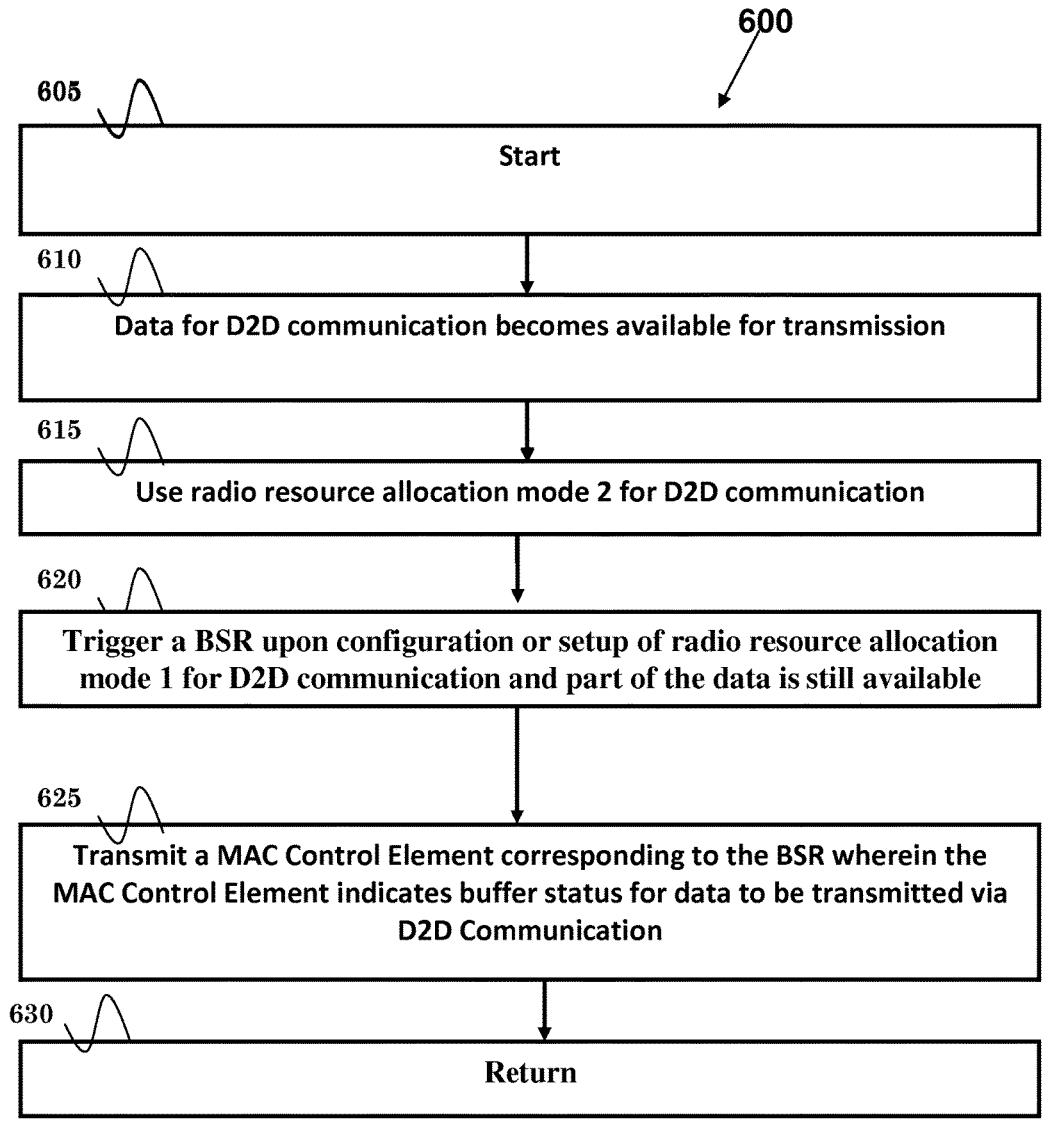
FIG. 7 is a flow diagram illustrating another exemplary embodiment.

FIG. 7 illustrates another exemplary method 600. In step 605, the process starts. In step 610, data for D2D communication becomes available for transmission. At step 615, the UE uses radio resource allocation mode 2 for D2D communication. At step 620, the UE triggers a BSR upon configuration or setup of the radio resource allocation mode 1 for D2D communication and part of the data is still available. At step 625, the UE transmits a MAC control element corresponding to the BSR, wherein the MAC control element indicates the buffer status for data to be transmitted via D2D communication. At step 630, return.

In one exemplary method, the UE triggers a BSR when an event occurs. The event may comprise at least two conditions: (1) upon configuration or setup of buffer status reporting functionality to report buffer status for data to be transmitted via D2D communication, and (2) the UE has data available for transmission for D2D communication. The method further includes transmitting, by the UE, a Medium Access Control (MAC) Control Element corresponding to the BSR.

In another exemplary method, the UE triggers a BSR when an event occurs. The event may comprise at least two conditions: (1) configuration or setup of radio resource allocation mode 1 for D2D communication, and (2) the UE has data available for transmission for D2D communication. More specifically, the UE triggers a BSR upon configuration or setup of radio resource allocation mode 1 for D2D communication while the UE has data available for transmission for D2D communication. The method further includes transmitting, by the UE, a Medium Access Control (MAC) Control Element corresponding to the BSR.

In one embodiment, the method may further include that the UE is using radio resource allocation mode 2 for D2D communication before triggering the BSR. In one embodiment, the data may be available for transmission before triggering the BSR. In another embodiment, no data from a higher priority logical channel becomes available for transmission upon triggering the BSR. In another one embodiment, a timer may not expire upon the triggering the BSR. In addition, the timer may be a periodicBSR-Timer or retxBSR-Timer.

In another embodiment, there may be no MAC layer padding bits available upon triggering the BSR. In yet another embodiment, the UE may not change a serving cell upon triggering the BSR. In one embodiment, the UE may be in RRC_CONNECTED. In another embodiment, the UE may be allowed to use radio resource allocation mode 1. In the above embodiments, the BSR may be a Regular BSR.

In one embodiment of the method for improving D2D communication, the MAC Control Element may indicate buffer status for data to be transmitted via D2D communication. The MAC Control Element may be a D2D BSR MAC Control element in some embodiments. In another embodiment of the method for improving D2D communication, the configuration or the setup may be not used to disable the buffer status reporting functionality. In yet another embodiment, the configuration or the setup may be not used to disable the radio resource allocation mode 1.

In other embodiments, the method for improving D2D further includes that the UE receives the configuration or the setup by a Radio Resource Control (RRC) message. In one embodiment, the RRC message may be a RRCConnectionReconfiguration message. Alternatively, the UE may receive the configuration or the setup by system information. In one embodiment, the UE may receive the configuration or the setup from an evolved Node B (eNB).

In yet another embodiment, the method further includes triggering a Scheduling Request (SR) if the UE does not have uplink resources allocated for a new transmission. In one embodiment, the UE does not trigger the BSR upon another configuration or setup of buffer status reporting functionality which is used to report buffer status not for data to be transmitted via D2D communication. In another embodiment, the UE may be switched from using the radio resource allocation mode 2 for D2D communication to the radio resource allocation mode 1 for D2D communication.

Referring back to FIGS. 3 and 4, the device 300 includes a program code 312 stored in memory 310 for improving device to device (D2D) communication, wherein a user equipment (UE) is capable of D2D communication. The CPU 308 could execute program code 312 to enable the UE (i) trigger a buffer status report (BSR) when an event occurs, wherein the event comprises one or more conditions as listed in paragraph [0043]. For example, triggering a BSR upon configuration or setup of buffer status reporting functionality to report buffer status for data to be transmitted via D2D communication while the UE has data available for transmission for D2D communication, and (ii) to transmit a Medium Access Control (MAC) Control Element corresponding to the BSR. In addition, the CPU 308 can execute the program code 312 to perform all of the above-described actions and steps or others described herein.

Alternatively, the device 300 include a program code 312 stored in memory 310 for improving device to device (D2D) communication, wherein a user equipment (UE) is capable of D2D communication. The CPU 308 could execute program code 312 to enable the UE (i) to trigger a buffer status report (BSR) when an event occurs, wherein the event comprises one or more conditions listed in paragraph [0043]. For example, triggering a BSR upon configuration or setup of radio resource allocation mode 1 for D2D communication while the UE has data available for transmission for D2D communication, and (ii) to transmit a Medium Access Control (MAC) Control Element corresponding to the BSR. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for improving device to device (D2D) direct communication, the method comprising:
   receiving, by a user equipment (UE), a setup of radio resource allocation mode 1 for D2D direct communication from an evolved Node B (eNB), wherein the eNB schedules exact resources used by the UE to transmit direct data and direct control information if the radio resource allocation mode 1 is used;
   triggering, by the UE, a buffer status report (BSR) based on an event, wherein the event includes upon the setup of the radio resource allocation mode 1 for D2D direct communication while the UE has data available for transmission for D2D direct communication, wherein the UE has no data from a-logical channel that has higher priority than data which is already available for transmission for D2D direct communication, and that becomes available for transmission for D2D direct communication upon triggering the BSR; and
   transmitting, by the UE, a Medium Access Control (MAC) Control Element corresponding to the BSR to the eNB.

2. The method of claim 1, further comprising using, by the UE, radio resource allocation mode 2 for D2D direct communication before triggering the BSR, wherein the UE selects resources from resource pools to transmit the direct data and the direct control information if the radio resource allocation mode 2 is used.

3. The method of claim 1, wherein a timer does not expire upon the triggering the BSR.

4. The method of claim 1, wherein the data is available for transmission before triggering the BSR.

5. The method of claim 1, wherein the BSR is a Regular BSR.

6. The method of claim 1, wherein the MAC Control Element indicates buffer status for the data to be transmitted via D2D direct communication.

7. The method of claim 1, wherein the UE is switched from using the radio resource allocation mode 2 for D2D direct communication to the radio resource allocation mode 1 for D2D communication.

8. The method of claim 1, wherein the setup is not used to disable the radio resource allocation mode 1.

9. The method of claim 1, wherein the UE receives the setup by a Radio Resource Control (RRC) message.

10. A communication device for improving device to device (D2D) communication, the communication device comprising:
    a control circuit;
    a processor installed in the control circuit; and
    a memory installed in the control circuit and operatively coupled to the processor;
    wherein the processor is configured to execute a program code stored in the memory to enable the communication device to:
      receive a setup of radio resource allocation mode 1 for D2D direct communication from an evolved Node B (eNB), wherein the eNB schedules exact resources used by the communication device to transmit direct data and direct control information if the radio resource allocation mode 1 is used;

trigger a buffer status report (BSR) based on an event, wherein the event includes upon the setup of the radio resource allocation mode 1 for D2D direct communication while the communication device has data available for transmission for D2D direct communication, wherein the communication device has no data from a-logical channel that has higher priority than data which is already available for transmission for D2D direct communication, and that becomes available for transmission for D2D direct communication upon triggering the BSR; and transmit a Medium Access Control (MAC) Control Element corresponding to the BSR to the eNB.

11. The communication device of claim 10, wherein the program code stored in the memory further enables the communication device to use radio resource allocation mode 2 for D2D direct communication before triggering the BSR, wherein the communication device selects resources from resource pools to transmit the direct data and the direct control information if the radio resource allocation mode 2 is used.

12. The communication device of claim 10, wherein a timer does not expire upon the triggering the BSR.

13. The communication device of claim 10, wherein the data is available for transmission before triggering the BSR.

14. The communication device of claim 10, wherein the BSR is a Regular BSR.

15. The communication device of claim 10, wherein the MAC Control Element indicates buffer status for the data to be transmitted via D2D direct communication.

16. The communication device of claim 10, wherein the communication device is switched from using the radio resource allocation mode 2 for D2D direct communication to the radio resource allocation mode 1 for D2D direct communication.

17. The communication device of claim 10, wherein the setup is not used to disable the radio resource allocation mode 1.

18. The communication device of claim 10, wherein the communication device receives the setup by a Radio Resource Control (RRC) message.

* * * * *